(12) United States Patent
Pedrini

(10) Patent No.: US 8,360,047 B2
(45) Date of Patent: Jan. 29, 2013

(54) CUTTING MACHINE FOR BLOCKS OF NATURAL STONE AND SIMILAR INTO SLABS WITH DIAMOND WIRES

(76) Inventor: Luigi Pedrini, Bergamo (IT)

( * ) Notice: Subject to any disclaimer, the term of this patent is extended or adjusted under 35 U.S.C. 154(b) by 228 days.

(21) Appl. No.: 12/680,568

(22) PCT Filed: Sep. 28, 2007

(86) PCT No.: PCT/IT2007/000683
§ 371 (c)(1),
(2), (4) Date: May 12, 2010

(87) PCT Pub. No.: WO2009/040841
PCT Pub. Date: Apr. 2, 2009

(65) Prior Publication Data
US 2010/0212650 A1   Aug. 26, 2010

(51) Int. Cl.
*B28D 1/08* (2006.01)
(52) U.S. Cl. .................. 125/21; 125/13.02; 451/311
(58) Field of Classification Search ............ 125/21, 125/39, 16.01, 16.02; 83/169, 592, 641.1; 451/331
See application file for complete search history.

(56) References Cited

U.S. PATENT DOCUMENTS

| 5,690,092 | A * | 11/1997 | Ogyu | 125/21 |
| 6,171,208 | B1 * | 1/2001 | Pellegrini | 474/112 |
| 6,463,922 | B2 * | 10/2002 | Petitjean | 125/21 |
| 6,513,514 | B1 * | 2/2003 | Micheletti | 125/21 |
| 7,770,575 | B2 * | 8/2010 | Brocco | 125/21 |

FOREIGN PATENT DOCUMENTS

| DE | 102 32 667 A1 | 2/2004 |
| EP | 1 024 314 A1 | 8/2000 |
| EP | 1 598 162 A1 | 11/2005 |
| WO | WO 00/05021 | 2/2000 |

OTHER PUBLICATIONS

PCT International Search Report dated Sep. 11, 2008.
PCT International Preliminary Examination Report on Patentability dated Jan. 11, 2010.

* cited by examiner

*Primary Examiner* — Dung Van Nguyen
(74) *Attorney, Agent, or Firm* — McGinn IP Law Group, PLLC

(57) ABSTRACT

A machine for cutting blocks of natural or similar types of stone includes a plurality of diamond-wire loops, wound about an assembly for the support and transmission of the cutting motion to said diamond-wire loops and at least one assembly for supporting, tensioning and guiding the diamond-wire loops; said assemblies move vertically in unison on the structure of the machine; and presents said supporting, tensioning and guiding assembly comprising a set of pulleys for the support and return of each diamond-wire loop, which are mounted and registered, for wire tensioning, on a movable tensioning means whose registration movement is actuated by a tensioning control means, independently of the movable tensioning means of contiguous diamond wires. In its preferred embodiment, the machine also presents an assembly for the support and transmission of the cutting motion to the said diamond-wire loops which includes a wide-diameter wheel about which a belt is wound that is provided with races for housing the diamond-wire loops and which is tensioned by means of a tensioning wheel.

20 Claims, 8 Drawing Sheets

CUTTING MACHINE FOR BLOCKS OF NATURAL STONE AND SIMILAR INTO SLABS WITH DIAMOND WIRES

FIELD OF THE INVENTION

The present invention relates to a machine for cutting into slabs natural or other types of stone using diamond wires, a device that is known in natural stone-cutting and uses diamond wire loops supported by rotating rollers or pulleys that draw the diamond wires through the block of natural stone thus cutting the block into slabs, each of the same size but reduced in thickness compared to the original to block.

PRIOR ART

The previous art includes various types of machines for cutting blocks of natural stone with multiple diamond wires, having identical or very similar loop-paths in which the closed-loop wires are supported and driven by rollers and/or pulleys, which transmit the cutting motion to the diamond wire in the block and tension it to the required degree in order to obtain slabs of cut stone with sufficiently precise planar surfaces.

The rotating movement is generally transmitted to the plurality of wires by a roller with moulded or added grooves, suitably coated with or made from rubber or other yielding non-metallic material, as the diamond wire, owing to its fixed and spaced diamond rings, wraps the grooves with contact from both the rings and part of the wire, thus transmitting tangential force and limiting wear and tear due to contact between the diamond rings and their respective groove.

As mentioned, in the previous art the tensioning of each loop is achieved by registering the position of the pulleys or the return roller, which are subdivided for the purpose into single pulleys set apart at the distance at which the wires are required to work for cutting the slabs to the required thickness. Diamond wire tensioning means are known, for example from patent application WO 00/05021 A1, in which the tensioning pulleys, by working on alternate wires in either the draw or return sections of the loop, act radially, whether pushing or pulling, on the individual wire, so as to tension all the wires. In this case, however, the means work on two sections at least, or on different points in the course of the wires.

Other tensioning methods, for example from patent application EP 1024314 A1, involve tensioning the single wire with the respective wheel on the return roller: in fact, each wheel is movable and driven from inside the hub by a hydraulic cylinder for tensioning the diamond wire loop mounted on it.

Different rates of give and/or stretching of the diamond wire through use and age makes it necessary to tension each wire individually in order to achieve similar, if not identical, tension in the wires that are working alongside each other during the cutting of the slabs from the block of natural stone.

It is known in the art that the tensioning means inside the hub of the wires' return roller are costly to manufacture and maintain, since the large revolving bearings between each wheel and the tensioning means in the hub need replacing with relative frequency. Down-time costs for repair work are extremely high, since the greater part of wheels and external bearings need to be dismantled when a bearing in an internal wheel deteriorates; furthermore, it is not cost-effective to replace revolving bearings in the wheels adjacent to the one requiring maintenance, unless they need to be replaced, given the extremely high cost of the wide-diameter low-thickness revolving bearings used. The last cited patent application of prior art shown already other ways to support and tensioning wire-loops by a couple of pulleys or flywheels with different diameter on the same wire-loop: the smaller-diameter to perform "fine" tensioning and the other pulley or flywheel to perform "rough" tensioning; two different registrations occur by two different tensioning control means on different tensioning directions.

Furthermore, tensioning by means of pulleys on the draw and return sections, for example from patent application EP 1598162 A1, requires pulleys or wheels that do not have a wide diameter to avoid excessive bulkiness of the machine, thus rendering the winding of the wire around them detrimental to the life-span and durability of the wire itself. Diamond wire requires rollers, wheels or pulleys with diameters equal to or greater than one meter in order to ensure an acceptable average durability. Indeed, the steel wire supporting the diamond rings bends every time it wraps around a wheel, pulley or roller and describes a rotation arc on it.

In recent embodiments, tensioning is divided between two means, one for moving the pulleys for large-scale registration, as in the case of the replacement of one or more diamond-wire loops, and one for the fine-tuning of the tension of an individual wire.

Therefore, means for supporting, tensioning and rotating are known in the previous art that are complicated, or made up of a large number of components, costly and/or having high maintenance costs; this includes the time spent assembling and dismantling the parts of the means: both during standard maintenance, as when replacing diamond-wire loops, and during special maintenance, as when replacing or repairing parts of the means itself. Replacement of the revolving bearings in the tensioning pulleys or of the yielding non-metallic material lining of the grooves of the roller or wheel transmitting the cutting action are the most onerous forms of maintenance.

Therefore, the technical problem that is at the base of the present invention is the construction of a machine for cutting blocks of natural or other types of stone into slabs using multiple diamond wires which eliminates or greatly reduces the inconveniences and limitations, as well as the time and money spent, including for maintenance, of current machines, as described above.

A specific aspect of the technical problem is to develop a way of supporting and tensioning the diamond-wire loops that is simple, by reducing the number of components, efficient, in other words that achieves the set objectives with the said components without thereby damaging the diamond wire and impairing its durability, and cost-effective, by pre-ordering parts so as to minimise production and maintenance costs, in terms of both the time required for troubleshooting and the intrinsic cost of the parts needing replacing, as well as in terms of their ease of transportation.

Not least and analogously, a further specific aspect of the technical problem, which is no less important and is indeed analogous, is that of creating a type of support and transmission of rotation movement to the diamond-wire loops that is simple, efficient and cost-effective, since previous art displays the greatest degree of wear and tear of the parts of the machine in this respect.

SUMMARY OF THE INVENTION

In the present invention, this technical problem is resolved by a machine for cutting blocks of natural or other types of stone into slabs that includes: a plurality of diamond-wire loops wound about an assembly that supports and transmits the cutting movement to the said diamond-wire loops and at least one assembly supporting, tensioning and guiding the diamond-wire loops; the said assemblies are movable vertically and in unison on the framework of the machine; the machine is characterised in that the said supporting, tensioning and guiding assembly comprises a set of pulleys for the support and return of each diamond-wire loop that is mounted and registered for wire tensioning on a movable tensioning element, with the registration movement activated by a tensioning control means independently of the movable tensioning element of contiguous diamond-wire loops.

In a further and advantageous embodiment, the machine for cutting blocks of natural or other types of stone into slabs includes: a plurality of diamond-wire loops wound about an assembly that supports and transmits the cutting movement to the said diamond-wire loops and at least one group for supporting, tensioning and guiding the diamond-wire loops; the said assemblies are movable vertically and in unison on the framework of the machine; said machine is characterised in that it presents said assembly supporting and transmitting the cutting movement to said diamond-wire loops comprising a wide-diameter wheel wound by a belt with grooves for housing the diamond-wire loops, which is tensioned by a belt-tensioning wheel.

Further characteristics and advantages of the present invention, in the embodiment of a machine for cutting blocks of natural or other types of rock into slabs by means of a plurality of diamond-wire loops, will emerge from the description that follows of a sample embodiment given by way of example and non-restrictively with reference to the eight plates of drawings attached.

DETAILED DESCRIPTION OF THE PREFERRED EMBODIMENT

Figure 1:
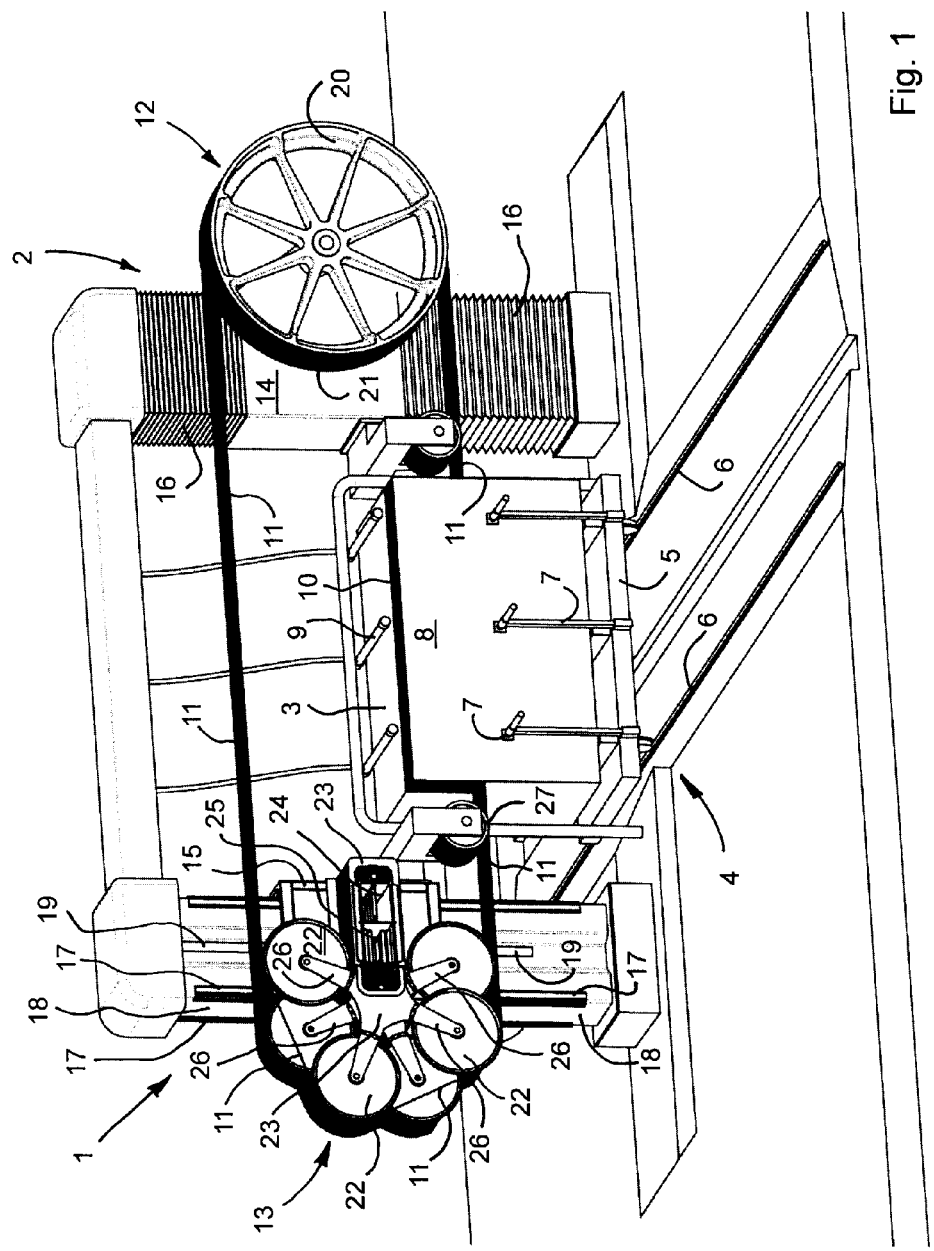
FIG. 1 is a schematic oblique elevation of the machine for cutting natural stone blocks into slabs in accordance with the present invention, in which a block during sawing and the supporting frame for parts rotating, supporting and tensioning the diamond-wire loops may be seen.

The machine for cutting into slabs blocks of natural or similar types of stone using multiple diamond wires comprises, in accordance with FIG. 1, a supporting frame with two uprights 1,2 positioned on either side of the block 3 of natural stone being cut. The block is positioned in work area 4 on a carriage 5 moving on guides 6 arranged transversally to the uprights of the supporting frame and equipped with standard clamps 7 for slabs 8 at the end of the cutting process. Sprays 9 overhang block 3 for delivering cooling water inside cuts 10 between slabs 8, which are obtained by the cutting motion of the diamond-wire loops 11 stretched between a support and drive assembly 12 and a support and diamond wire tensioning assembly 13 on the machine. Vertically movable sleds 14, 15 are paired on the uprights, each supporting one of said assemblies 12 and 13. Upright 1 is shown without diaphragm 16 protecting the vertical guides 17 mounted on the sides 18 of the upright, whereas the diaphragms are shown on upright 2; sled 14 is moved along the upright by a lead screw 19 and internal screw system. Upright 2 being provided with identical mechanisms for sled 15. The two sleds 14 and 15 are moved in unison by a rotation transmission mechanism along the screws 19 of a known type.

Support and drive assembly 12 comprises, furthermore, a roller or wheel 20 with a wide diameter for winding diamond-wire loops 11 within adjacent grooves 21. Group 12 is supported with the motor by a projecting bracket on carriage 14, which is not shown here.

Support and tensioning assembly 13 also comprises a series of pulleys 22, advantageously three for each diamond-wire loop supported on a corresponding slider 23, sliding on supporting structure 24, which projects from the sled and is controlled in its movement in the direction of tensioning, in this case horizontally, by tensioning control means 25. The sets of three pulleys are advantageously offset for adjacent wires so as to make use of the free space between two adjacent pulleys for the insertion of forks 26 corresponding to the set of pulleys for the adjacent wire.

Figure 2:
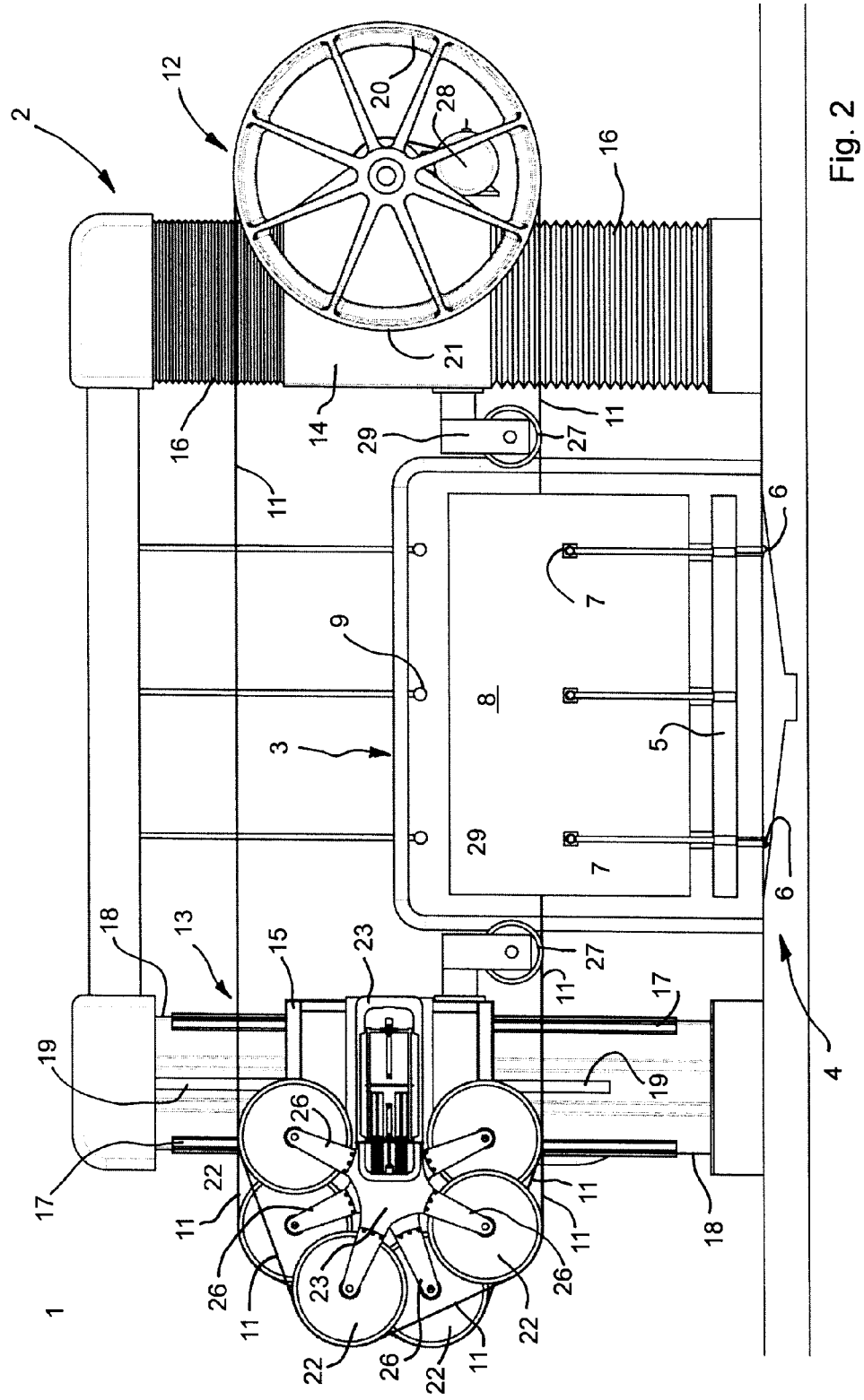
FIG. 2 is a schematic frontal view on the development plan of diamond-wire loops of the machine in FIG. 1.
Figure 4:
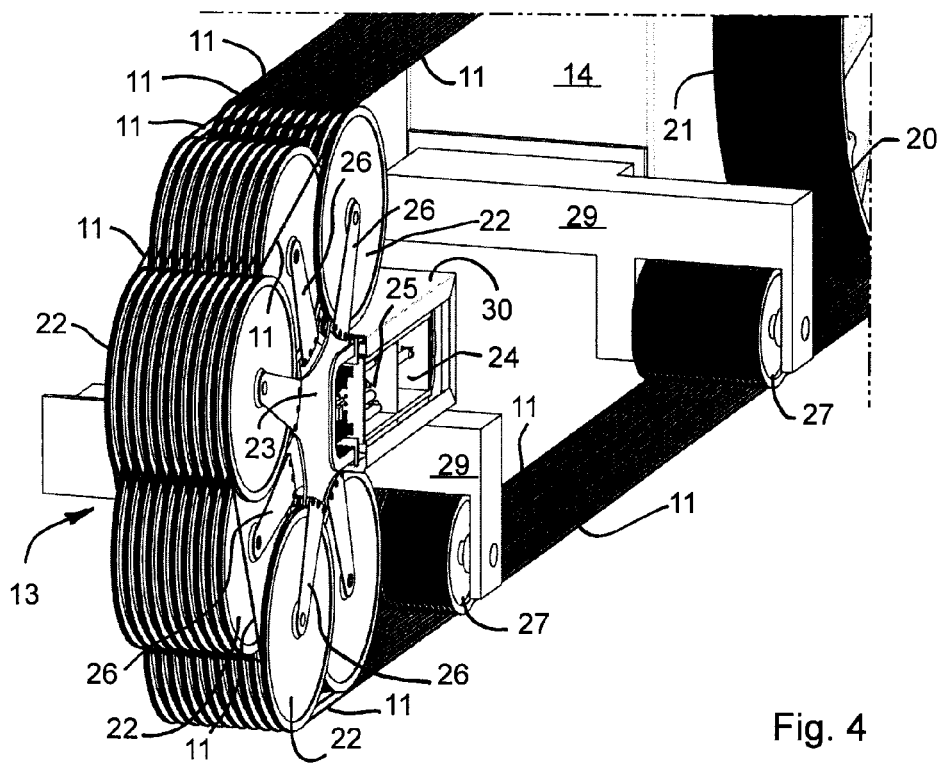
FIG. 4 is a schematic oblique elevation of the assembly supporting, tensioning and guiding the diamond-wire loops on the block, which is not shown here.

Between said assemblies 12 and 13 and block 3 a pair of grooved rollers 27 are positioned on the lower working section of the diamond-wire loops to provide torsion to said wires generating axial rotation of the respective wire so as to present a new cutting edge of the diamond rings at the subsequent passage of the wires through cuts 10 in the block. In FIG. 2, furthermore, the electric drive motor 28 for transmitting motion to the roller or wheel 20 and the supports 29 for said grooved rollers 27 are visible. FIG. 4 shows external protection 30 for sliders 23 and for tensioning control means, as well as the side-by-side spatial arrangement of the sets of three pulleys 22 and their respective forks 26 in relation to those of the adjacent slider 23, namely of the adjacent diamond-wire loop 11.

Furthermore, support and tensioning assembly 13, as seen in FIGS. 5-11, presents comb guide 31 for sliders 23, attached to mounting means on structure 24 of sled 15 allowing insertion of sliders and their sliding by means of the tensioning control means 25. A series of actuator cylinders, advantageously hydraulic, is arranged in offset pairs 32, 33 to thrust each slider 23 internally in the tensioning direction for diamond wires 11, on the rear inner face 34 of each respective slider; each rod, of said cylinders 32 and 33, is wrapped in a diaphragm 35 for protection from the external environment. A series of actuator cylinders 36, advantageously hydraulic, is positioned on the centre-line of said rear inner face 34 of sliders, so as to act, by means of a transversal bar 37, in unison on said inner faces thereby moving sliders 23, with sets of pulleys 22, in the tensioning direction for the wires, in other words from the retracted position for mounting and dismantling the diamond-wire loops to the pre-tensioning position. For the opposite direction, there is a series of actuator cylinders 38, advantageously hydraulic, that engage with the centre-line of the front inner face 39 of the slider 23 by means of an analogous transversal bar 37, so as to allow the retraction of the sliders 23 with their respective sets of pulleys 22 and the replacement one or more diamond-wire loops.

Figure 7:
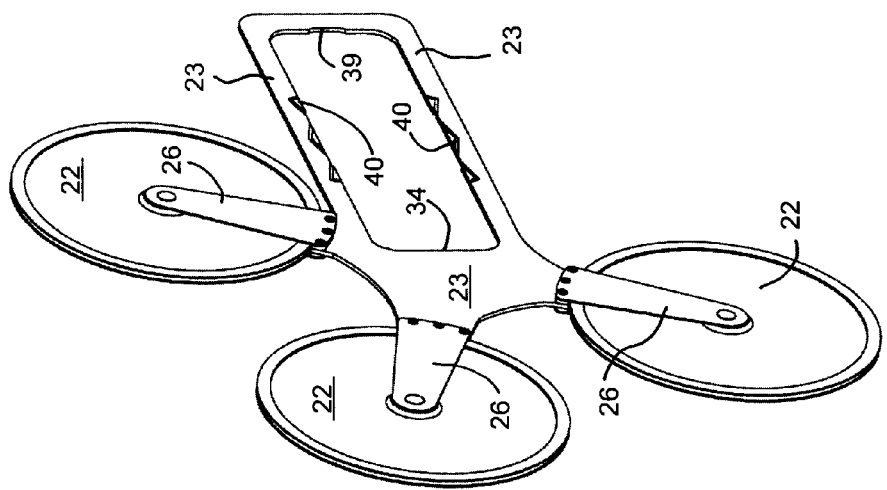
FIG. 7 is a single loop-path with the corresponding series of pulleys and their positioning and support forks.

The pulleys 22 are supported in their rotation on their respective forks 26 by means of revolving bearings that are small-diameter and therefore low-cost; FIG. 7 shows niches 40 on the inner edge of the sliders for creating a reserve of grease lubricant for sliding within comb guide 31.

Figure 9:
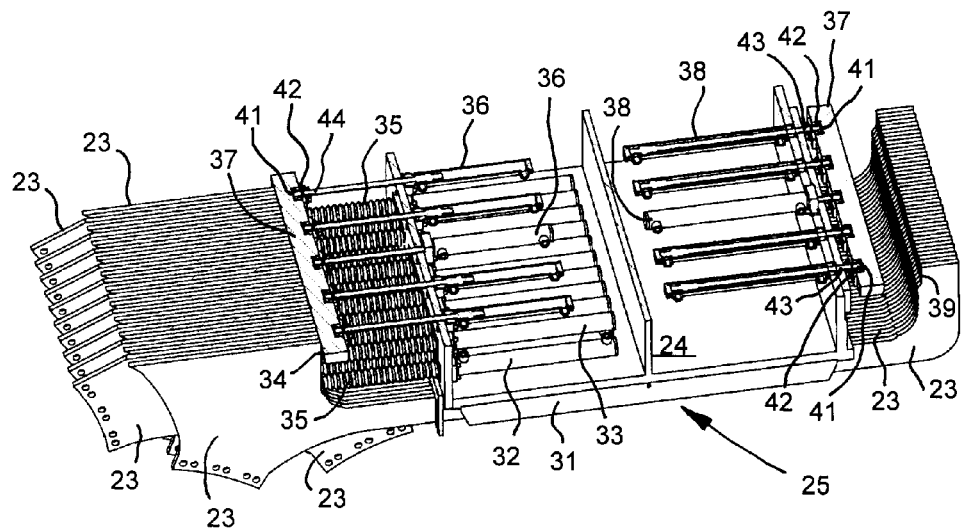
FIG. 9 is a cross-section of the actuator cylinders for positioning showing only the core of the device for the sake of clarity; of the pairs of cylinders for tensioning each individual loop-path, the lower cylinders are illustrated.
Figure 10:
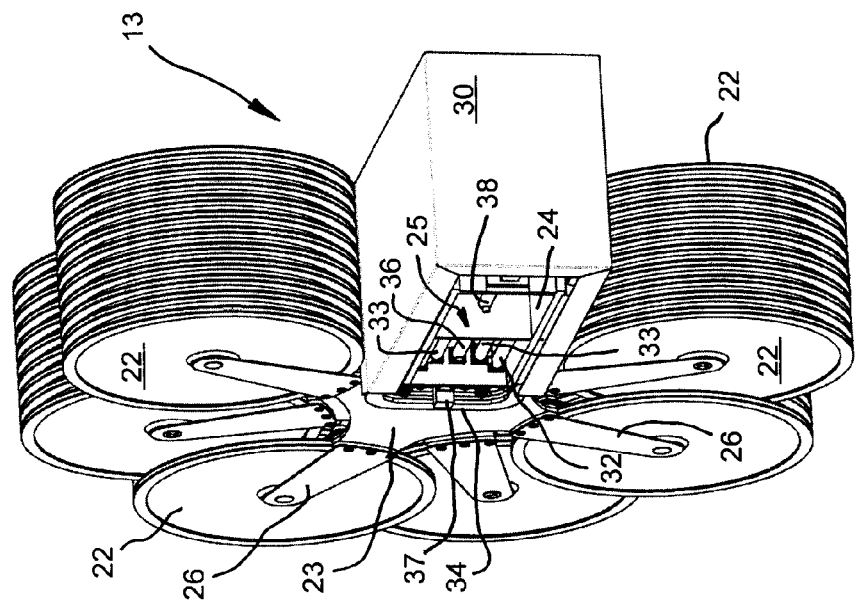
FIG. 10 is an enlarged schematic elevation of the tensioning and support device acting on the loop-paths, here illustrated with its external protection against the work environment and without the front cover.

As illustrated in FIG. 9, the positioning of sliders 23 and corresponding pulleys 22 connected thereto is achieved by means of actuator cylinders 38 for retraction, thus achieving the retracted position of the sliders and allowing ordinary maintenance of the diamond-wire loops. Actuator cylinders 38 advantageously have a double effect, retracting bar 37 after the sliders have reached the retracted position. Each of said cylinders 38 is connected to a corresponding indentation 41 on bar 37 by a flexible means 42 between rod 43 and said indentation; the flexible means allows compensation for slight differences in construction and mounting of cylinders and indentations on bar 37. Analogously, actuator cylinders 36 are coupled with the corresponding bar 37 by means of flexible means 42 at the extremity of respective rod 44.

Figure 11:
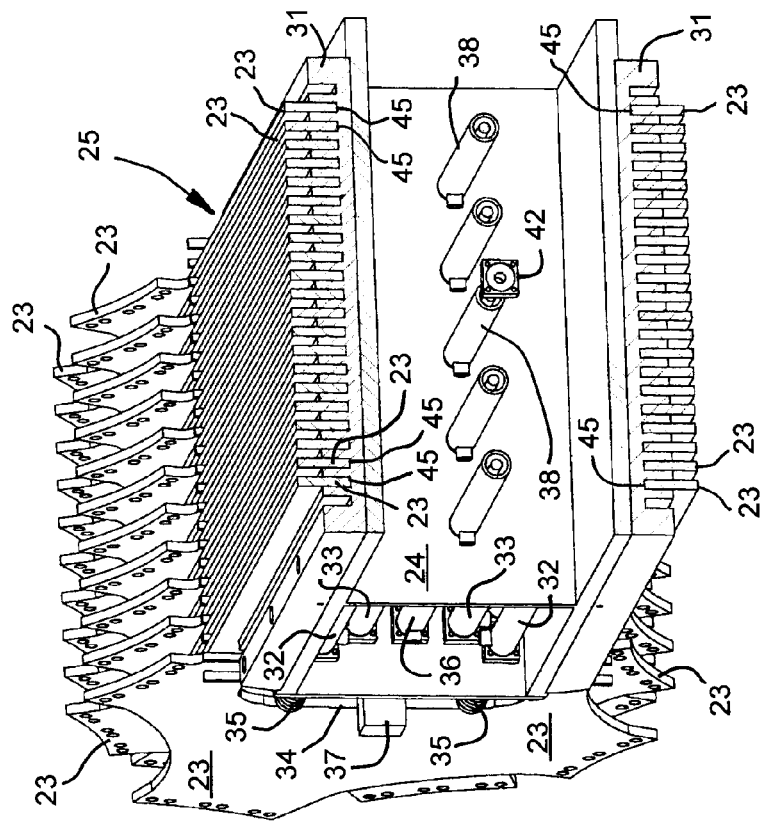
FIG. 11 is an enlarged schematic view, isolated and in perspective, of the tensioning and support device, showing internal loop-path elements and elements acting on the loop-paths.

Furthermore, FIG. 11 illustrates individual sliders 23 and their sliding coupling in comb guides 31. Each slider is housed in a channel 45 for guiding and supporting, on both upper side and lower side, within each slider. The channel features one or more reservoirs, which are not shown, for collecting lubrication grease in exchange and combination with the niches 40 of the sliders.

Figure 12:
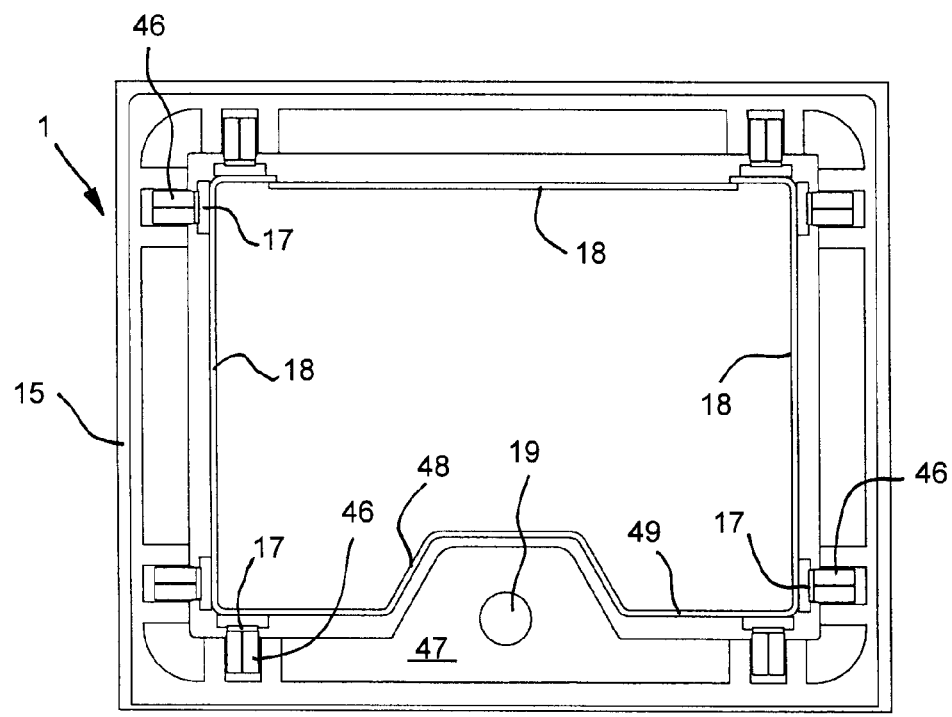
FIG. 12 is an enlarged schematic section of the guiding and rolling means, seen along the uprights, of the support carriages of the elements for supporting and driving the tensioning and guiding means of the said diamond-wire loops.

FIG. 12 shows the components of sled 15, which are analogously present in sled 14, where on vertical guides 17 revolving bearings 46 run on sides 18 of the upright. The vertical sliding movement is impressed upon the sled by the lead screw 19 coupled with internal screw 47, which is advantageously present and housed in channel 48 on front side 49.

Figure 3:
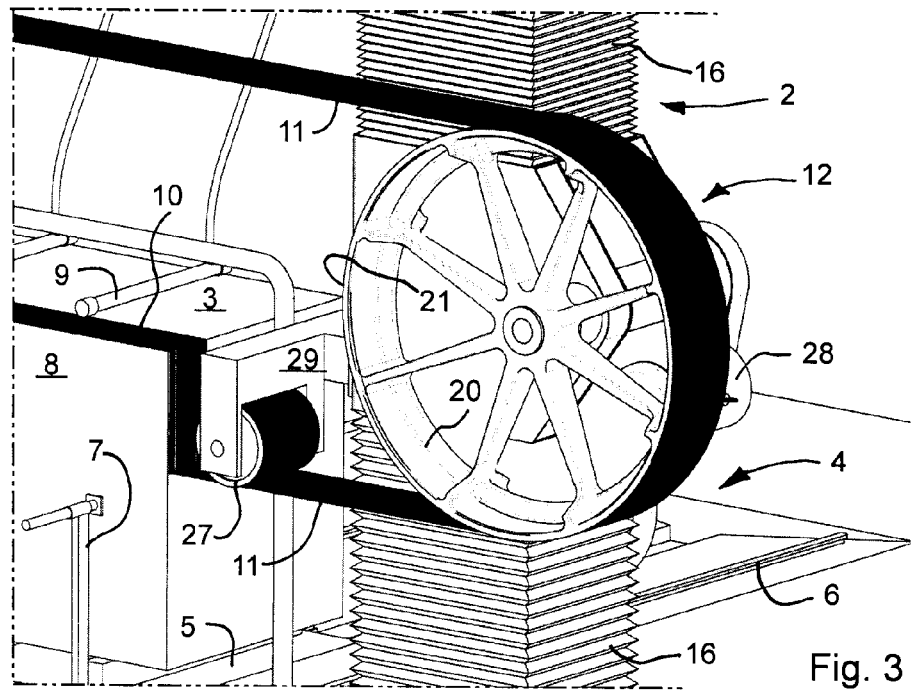
FIG. 3 is a schematic oblique elevation of the assembly supporting and driving the said sawing motion of the diamond-wire loops.
Figure 13:
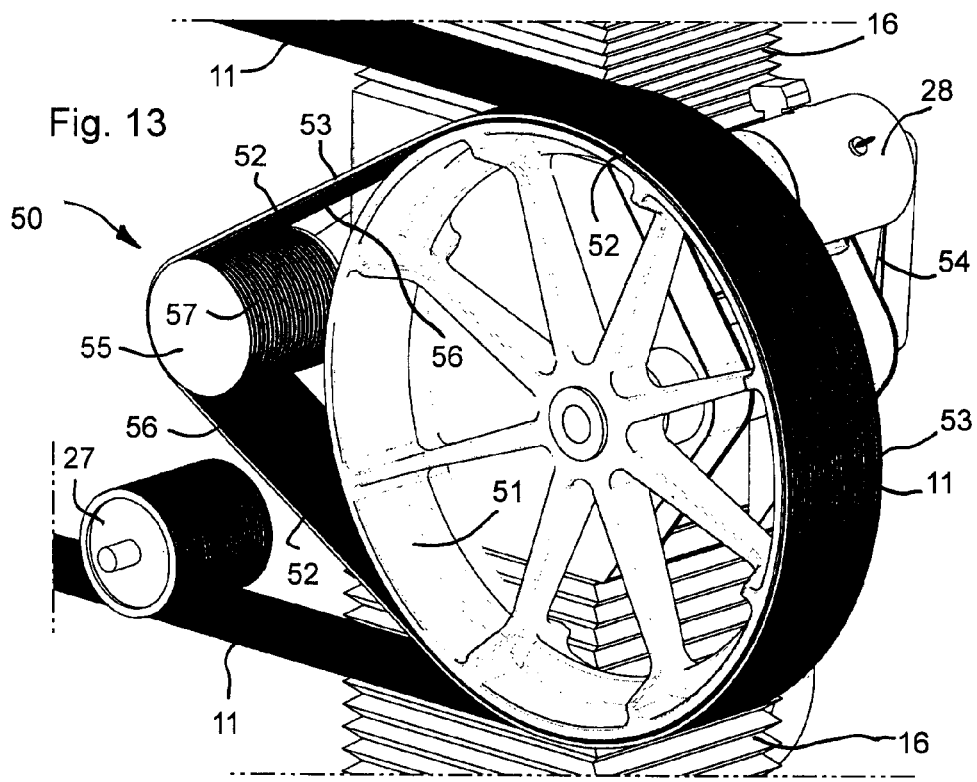
FIG. 13 is a schematic elevation of the means of supporting and driving the sawing motion of the diamond-wire loops, here in a further embodiment with a grooved belt and a belt tensioning roller.

Lastly, FIG. 13 shows, in a perfected embodiment of transmission 50 of the cutting motion to the diamond-wire loops 11, the wheel 51 around which is wound a belt 52 whose outside surface is provided with grooves 53 for housing the wires 11 of the diamond-wire loops; the grooves are distanced equally in accordance with grooves 21 on the roller, or wheel, of FIGS. 1-3. The rotating movement is generated by electric motor 28 and, by means of transmission 54, the rotation is transmitted to wheel 51 around which belt 52 is wound. A wheel 55 for tensioning the belt, or roller, is distanced from wheel 51 by known means. Belt 52 also has longitudinal ridges 56 on its internal surface. Correspondingly, wheel 55 and wheel 51 have circumferential grooves 57 for housing the said ridges.

The machine's diamond-wire loop tensioning means functions as follows. Diamond-wire loops 11 are placed in grooves 21 on wheel or roller 20 with support, guiding and tensioning means 13 fully retracted, therefore with actuator cylinders 38 that, by acting on transversal bar 37 against the front inner face 39 of sliders 23, position the set of pulleys 22 on each slider 23 towards work area 4. In such a way, the envelope of roller or wheel 20 and pulleys 22 is less than each diamond-wire 11 loop-path.

Figure 5:
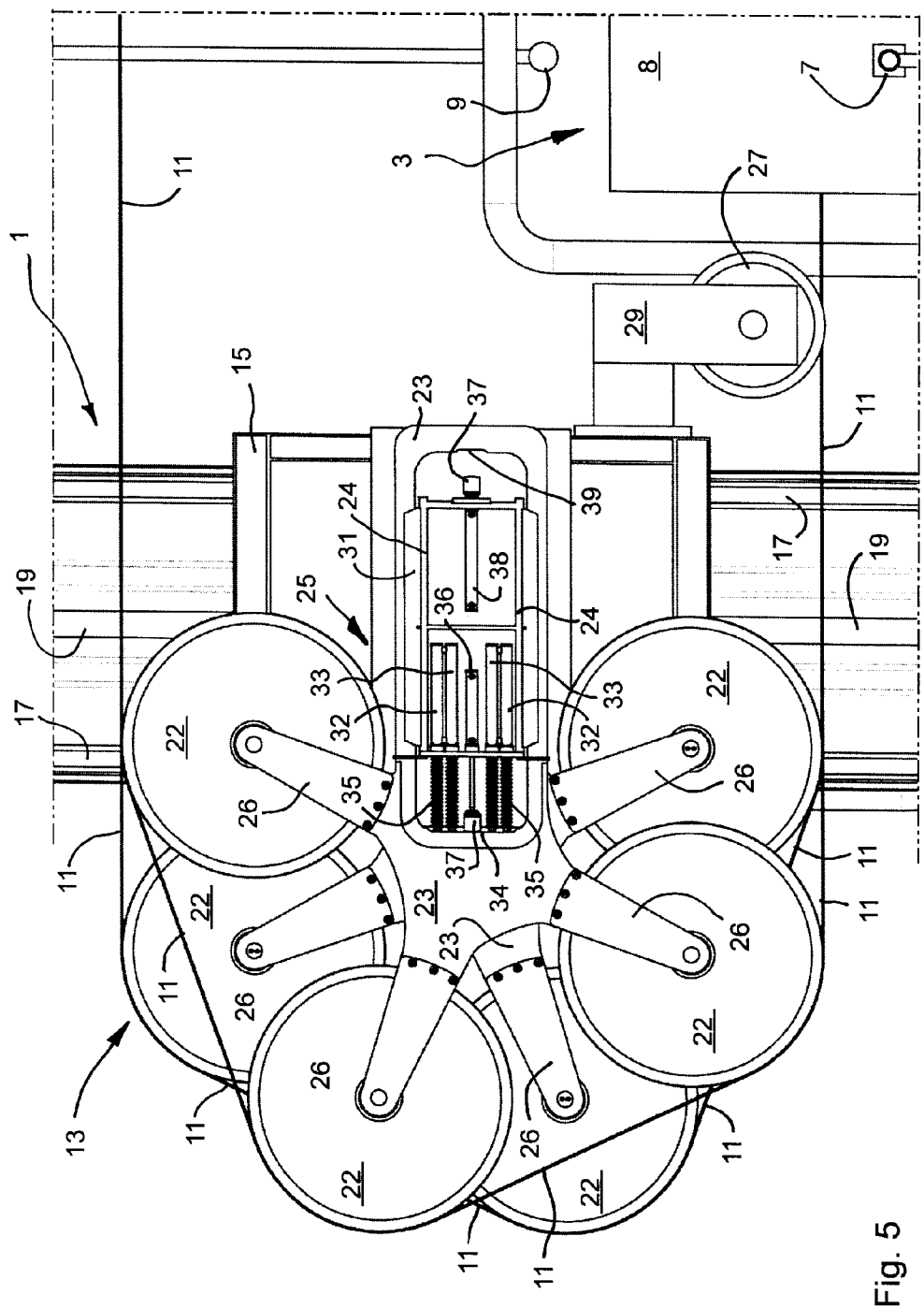
FIG. 5 is an enlarged schematic frontal plan view of the diamond-wire loops showing the tensioning and support means of the same, each individually, in reference to the machine in FIG. 1.
Figure 6:
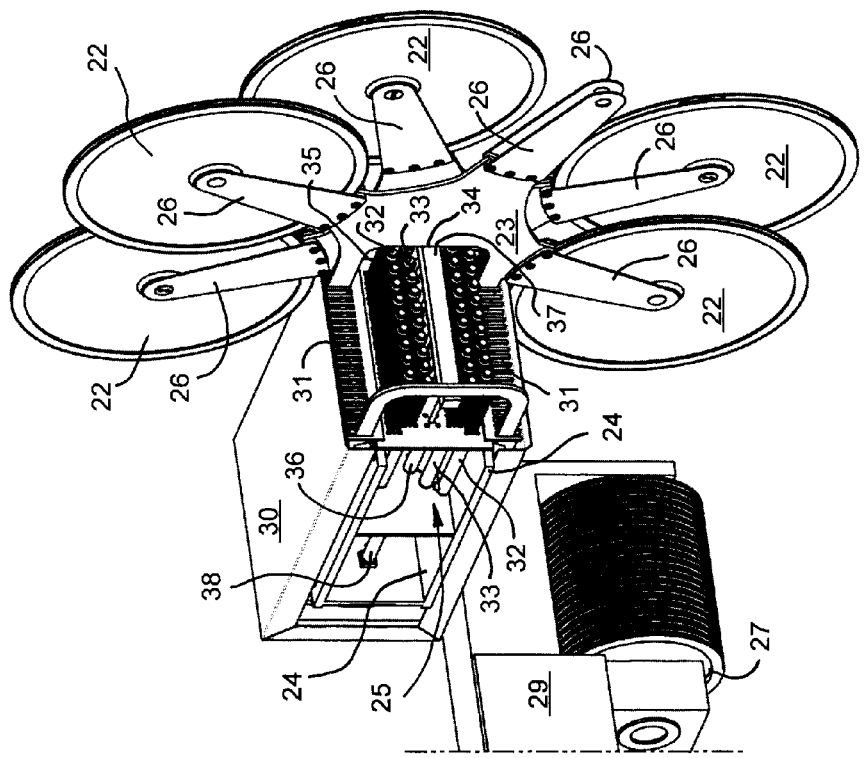
FIG. 6 is a schematic elevation of the tensioning and support means showing two series of pulleys, their respective paths and the layout of both positioning and tensioning cylinders for the pulleys of each diamond wire.
Figure 8:
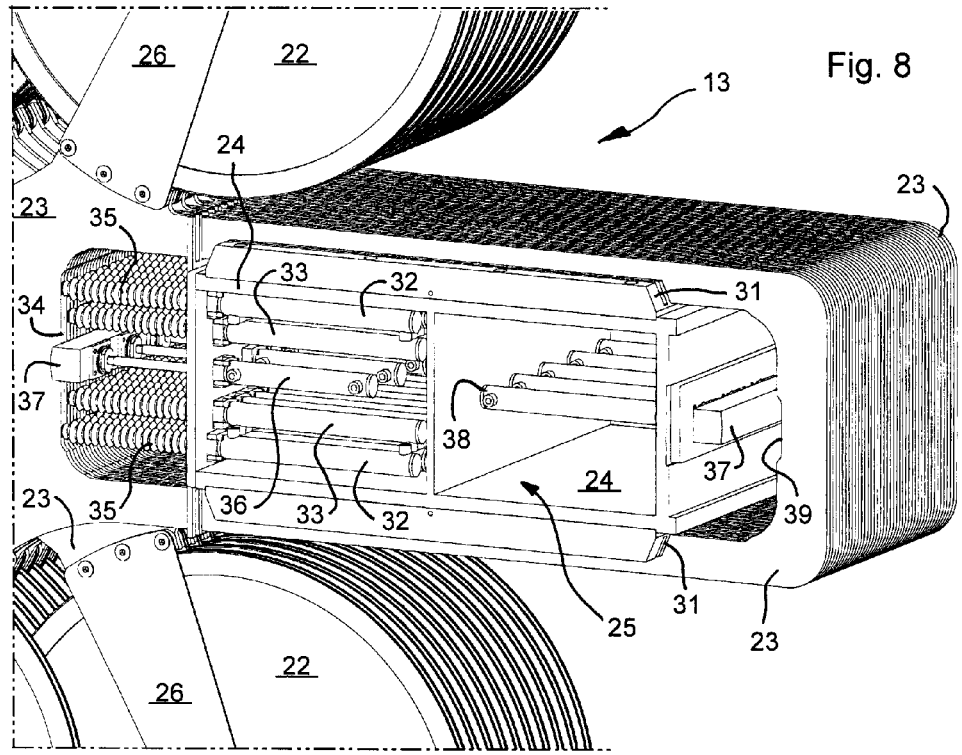
FIG. 8 is an enlarged schematic elevation of the tensioning and support device illustrating the internal parts acting on the loop-paths to position and tension to the required degree the diamond-wire loops of the machine in FIG. 1.

Subsequently, having housed all diamond-wire loops needed for the required thickness of slabs 8 that are to be cut from block 3, actuator cylinders 38, advantageously having a double-effect, are retracted as illustrated in FIG. 5 and, immediately afterwards, actuator cylinders 36 are extended, which, by acting on transversal bar 37 against rear inner face 34 of sliders 23, extend said sliders, thus bringing the diamond-wire loops 11 close to the point of tension. Since the path of each loop is not identical to the others, the resulting extended position will not be uniform. Thus, the tensioning means 25 fine-tunes the tension of each individual diamond wire 11. Indeed, coupled actuator cylinders 32 and 33, acting each on a single slider 23, as illustrated in FIG. 6, apply the necessary thrust to the corresponding slider to allow it to tension the diamond-wire loop 11 to the required degree. Regulation of tension occurs by regulation of the fluid-pressure inside said actuator cylinders 32 and 33.

Slider 23 is thus guided and kept in position by comb guide 31 located on supporting structure 24. Sliding motion is assisted by lubrication, advantageously by means of grease, through niches 40 present on the sliding edges of the sliders.

The penetration between forks 26 and the free space between two contiguous pulleys 22 of each set of three pulleys, advantageously allows full exploitation of the space using simple disc pulleys and, what is more advantageous, small-diameter revolving bearings in the rotating hub of pulleys 22 on forks 26. Further still, the position of tensioning means 25 on the outside of the pulleys makes possible the use of products that are commercially available and not tailor-made. Such positioning allows distribution over two cylinders, of the coupled actuator cylinders 32 or 33, of the work required to for tension the diamond wire, so as to exploit a greater thrusting surface and, where needed, to achieve high degrees of tension in the diamond wire.

The form of construction of the transmission means 50 of motion to diamond-wire loops 11 illustrated in FIG. 13 works by tension of belt 52 on the external surface of which races 53 have been provided, allowing transmission of rotating and cutting motion to diamond-wire loops 11. Furthermore, the belt guide on wheel 51 and wheel 55 is assisted by ridges 56 on the internal surface of the belt. Ridges 56 couple on the surface of wheel 51 and wheel, or roller, 55 with circumferential grooves 57 present thereon, thereby increasing friction and preventing slippage and/or sideways deviation. The construction of wheel 51 is thus simple and does not require the addition of grooves for housing and guiding the diamond-wire loops 11, in that said functions are deferred to belt 52 with races 53 on the external surface. Wear and tear through contact between the diamond rings on the wire and the groove is concentrated entirely upon the grooves on the belt, so that maintenance is necessary only thereupon by means of belt replacement, even that which is already scheduled. Maintenance on machines at distant sites can thus be carried out with ease, it not being necessary to modify or act upon wheel 51. Races 53 that are worn down and/or damaged by contact with the diamond rings on wire loops 11 are not applied to the surface of wheel 51 but to belt 52, which is easily folded and collapsed, unlike wheel 51, which can advantageously be manufactured as a single piece and delivered whole, even though it has a diameter of over 2.5 meters. For the purposes of maintenance, therefore, it will be sufficient to deliver a new belt and mount it on wheel 51 and roller 55. The belt can be manufactured using specific technology, namely vulcanisation of the rubber of which advantageously it is made, thus avoiding the need for analogous actions on wheel 51, namely vulcanisation of the rubber lining of grooves 21, as known in the current art.

The advantages of using the machine may be summed up in the machine's reduced bulk and in the use of a wide-diameter wheel, which prevents excessive strain upon the diamond wire. The distribution across several pulleys 22 on the return section of the diamond wire loops makes it possible to manufacture a tensioning means 25 for wires 11 that functions efficiently and at reduced cost, while at the same time preventing excessive bulk of machines that distribute tension points of the wires, as well as excessive strain on the wires, which notoriously reduces their durability. Furthermore, tensioning control means 25 is easy to assemble being external to pulleys 22 on the return section of the wire. Many components of the means are advantageously available commercially and therefore purchasable at reduced prices without the need for specific design and construction. Further still, the size of component parts may be considerable, thereby reducing the specific strain exercised on them, as in, for example, the greater active surface of actuator cylinders in couples 32, 33, compared to embodiments of cylinders internal to the hub of return pulleys known to the art. Additionally, the space between return pulleys 22 of the pulley assemblies, mounted on each sliding element 23, owing to their penetration, clearly seen in the figures, makes it possible to reduce the size of the support and tensioning assembly 13 keeping it within the spatial dimensions of a single wheel that is identical in its external diameter to the wheel or roller 20 present in the support and tensioning assembly 12 or 50.

Furthermore, the machine for cutting a block of natural stone into slabs by means of diamond wires, in the embodiment in FIG. 13, achieves a considerable reduction in manufacturing costs for wheel 51, in that circumferential grooves 57 can be made easily and require no further processing, such as vulcanisation of the rubber used for grooves in the known art. Indeed, vulcanisation is carried out on the belt 52, which, as mentioned, is flexible, collapsible and therefore easily transportable. The guiding of belt 52 on the surface of wheels 51 and 55 is provided by circumferential grooves 57 coupling with ridges 56, which are present on the belt on the surface that comes into contact with the wheels.

Lastly, the machine for cutting blocks of natural stone into slabs by means of diamond-wire loops, as herein described, presents considerable savings on the cost of both ordinary and extraordinary maintenance.

Naturally, a qualified technician may carry out numerous modifications to the machine for cutting into slabs blocks of natural or similar types of stone described above, for the purpose of addressing specific and contingent requirements, all of which are covered in the interests of protecting the present invention as defined in the following claims. Furthermore, the rotating movement generated by electric motor 28 can be transmitted, albeit less advantageously, to wheel 55, which becomes a drive wheel, and thence to belt 52. The distance of wheel 55 from wheel 51, which is thus idle, allows belt 52 to be tensioned by known means. Lastly, the set of pulleys 22 coupled with a single sliding element 23 can reduced, albeit less advantageously, to two pulleys only.

The invention claimed is:

1. A machine for cutting blocks of natural or similar types of stone, comprising:
   a plurality of diamond-wire loops, wrapping an assembly supporting and Transmitting the cutting motion to said diamond-wire loops, and
   at least one assembly for supporting, tensioning and guiding the diamond-wire loops; said assemblies being vertically mobile in unison on the structure of the machine;
   wherein said assembly for supporting, tensioning and guiding comprises a set of pulleys for the support and return of each diamond-wire loop, that are mounted and registered, for the independent wire tensioning each loop, on a movable tensioning element that is activated in its registration movement, with all pulleys in the set of pulleys in unison, by a tensioning control means independently of the movable tensioning element of contiguous diamond-wire loops.

2. A machine according to claim 1, wherein the movable tensioning elements are made to slide in the direction corresponding to the direction of tensioning of the diamond-wire loops.

3. A machine according to claim 2, wherein each sliding means comprises a slider with a closed conformation slidingly coupled with a guide and supported by the structure of the machine, and is vertically mobile for positioning the diamond-wire within the cut of the natural stone block.

4. A machine according to claim 2, wherein the pulleys supporting contiguous wire loops are equipped with supporting forks that are located in the spaces between the pulleys of contiguous tensioning element.

5. A machine according to claim 2, wherein the supporting pulleys are in sets of three for each sliding or movable element.

6. A machine according to claim 1, wherein the pulleys supporting contiguous wire loops are equipped with supporting forks that are located in the spaces between the pulleys of contiguous tensioning elements.

7. A machine according to claim 6, wherein the supporting pulleys are in sets of three for each sliding or movable element.

8. A machine according to claim 1, wherein supporting pulleys are in sets of three for each sliding or movable element.

9. A machine according to claim 1, wherein the tensioning control means comprises a pair of actuator cylinders for each sliding or movable element, for fine-tuning the tension in the corresponding diamond-wire.

10. A machine according to claim 1, wherein the tensioning means comprises also a positioning means for maintenance and subsequent repositioning.

11. A machine for cutting blocks of natural or similar types of stone, comprising:
    a plurality of diamond-wire loops, wrapping an assembly supporting and transmitting the cutting motion to said diamond-wire loops, and
    at least one assembly for supporting, tensioning and guiding the diamond-wire loops; said assemblies being vertically mobile in unison on the structure of the machine;
    wherein said assembly for supporting, tensioning and guiding comprises a set of pulleys for the support and return of each diamond-wire loop, that are mounted and registered, for the wire tensioning, on a movable tensioning element that is activated in its registration movement by a tensioning control means independently of the movable tensioning element of contiguous diamond-wire loops, wherein the movable tensioning elements are made to slide in the direction corresponding to the direction of tensioning of the diamond-wire loops, and wherein the sliding means comprises a slider equipped with supporting forks for each pulley of the set corresponding to said sliding means.

12. A machine according to claim 11, wherein a positioning and repositioning means of the sliders with the set of pulleys comprises actuator cylinders placed on the centre-line of the tensioning means.

13. A machine according to claim 12, wherein said actuator cylinders act on the sliders internally by means of a bar for coupling the rods, said coupling being made elastic by a flexible means between the extremity of each rod and an indentation in the bar.

14. A machine according to claim 13, wherein each slider fits into a channel on the slide guide of the same on the machine and presents channel lubrication means.

15. A machine according to claim 12, wherein each slider fits into a channel on the slide guide of the same on the machine and presents channel lubrication means.

16. A machine according to claim 11, wherein in which each slider fits into a channel on the slide guide of the same on the machine and presents channel lubrication means.

17. A machine according to claim 11, wherein each sliding means comprises a slider with a closed conformation slidingly coupled with a guide and supported by the structure of the machine, and is vertically mobile for positioning the diamond-wire within the cut of the natural stone block.

18. A machine for cutting blocks of natural or similar types of stone, comprising:

a plurality of diamond-wire loops, wrapping an assembly supporting and transmitting the cutting motion to said diamond-wire loops, and at least one assembly for supporting, tensioning and guiding the diamond-wire loops; said assemblies being vertically mobile in unison on the structure of the machine;

wherein said assembly for supporting, tensioning and guiding comprises a set of pulleys for the support and return of each diamond-wire loop, that are mounted and registered, for the wire tensioning, on a movable tensioning element that is activated in its registration movement by a tensioning control means independently of the movable tensioning element of contiguous diamond-wire loops, wherein said assembly for support and transmission of the cutting motion to said diamond-wire loops comprises a wide-diameter wheel around which a belt is wound with races for housing the diamond-wire loops that is tensioned by a tensioning wheel.

19. A machine according to claim 18, wherein the belt is provided with ridges on its internal surface running along the line of its path; correspondingly, both the wide-diameter wheel and the tensioning wheel are equipped with circumferential grooves for housing said ridges.

20. A machine according to claim 18, wherein the wide-diameter wheel becomes a drive-wheel for the transmission of rotating motion to the belt and to the diamond-wire loops by means of the same.

* * * * *